April 9, 1929.  D. C. KLAUSMEYER  1,708,420
MONOARM CONTROL
Filed Nov. 27, 1926  5 Sheets-Sheet 2
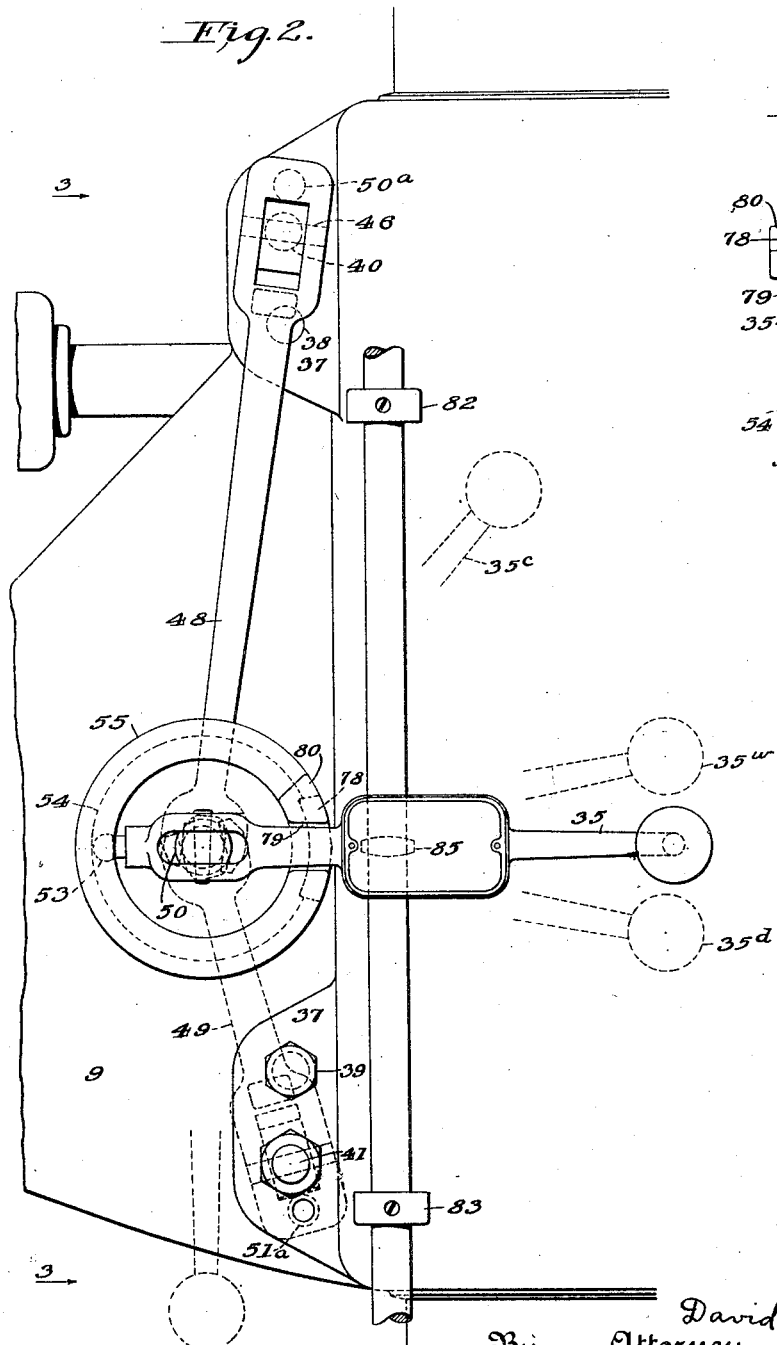
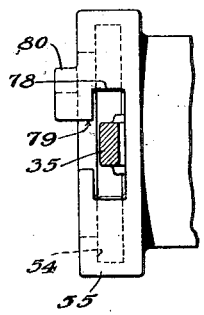
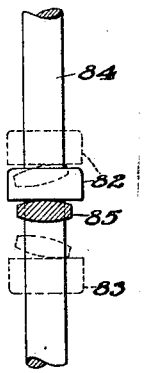
Inventor
David C. Klausmeyer
By Attorney
Albert P. Nathan

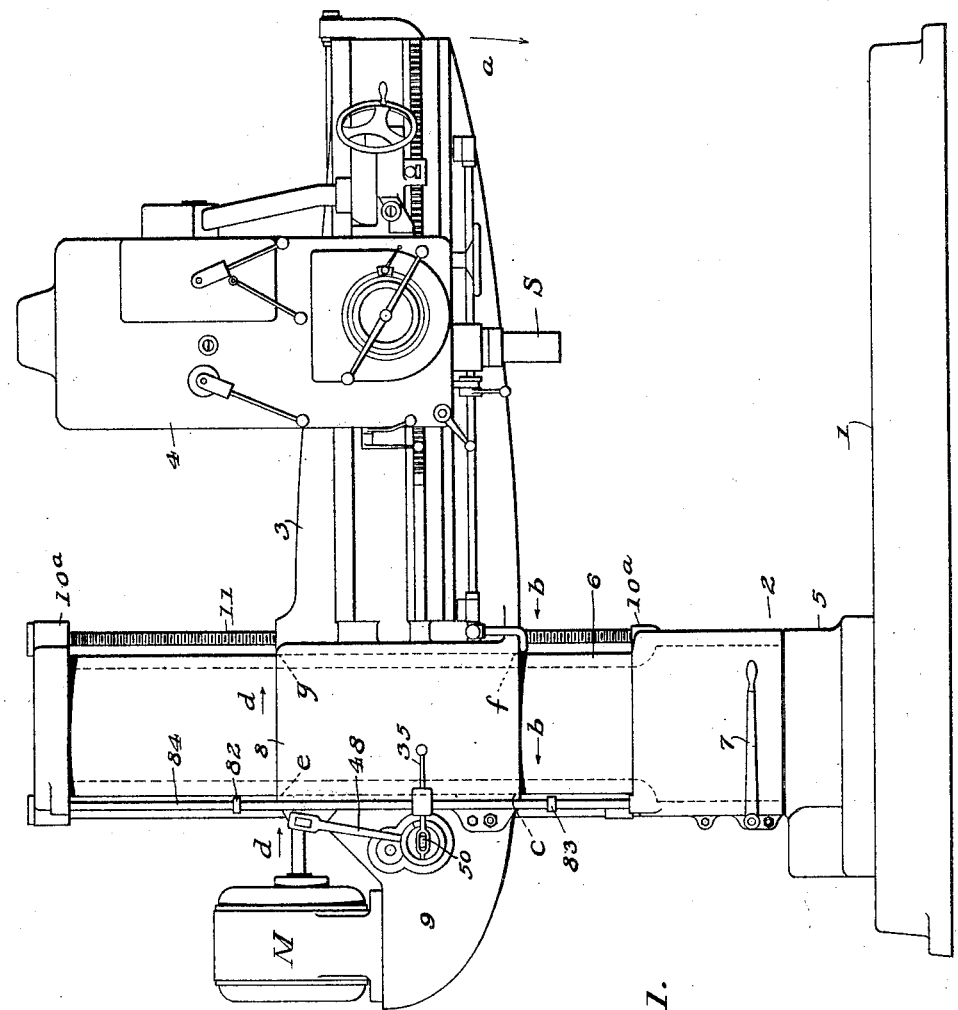

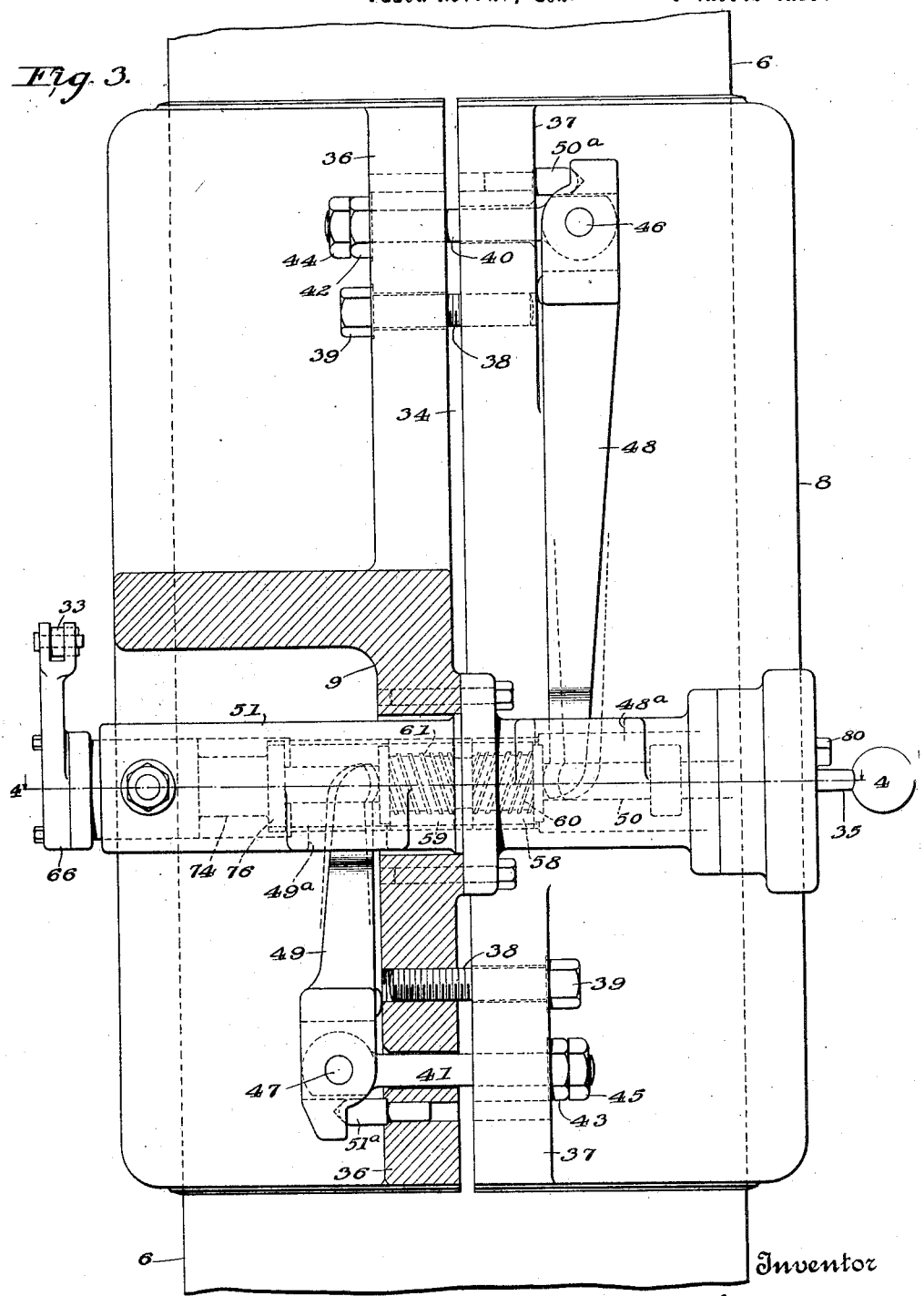

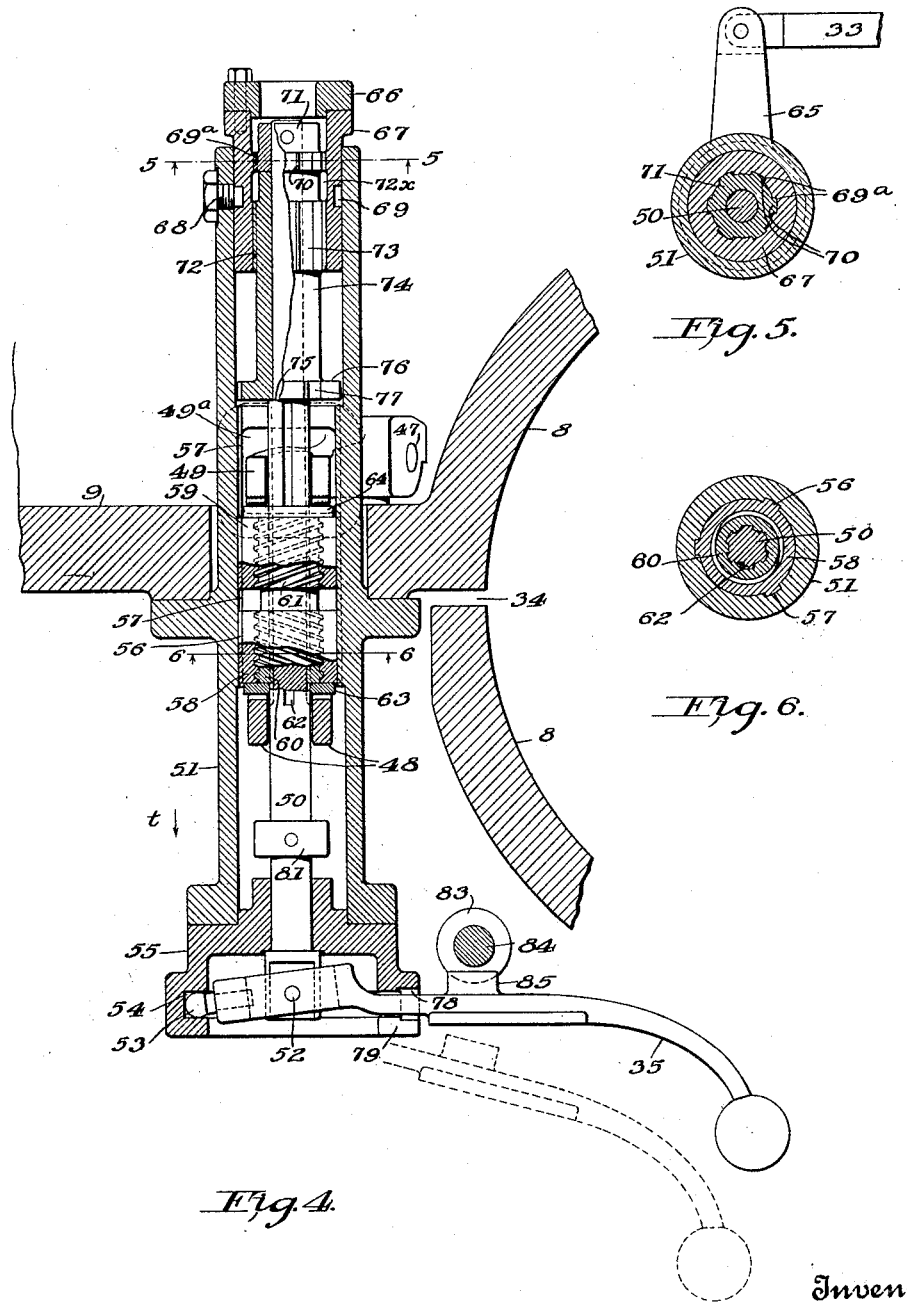

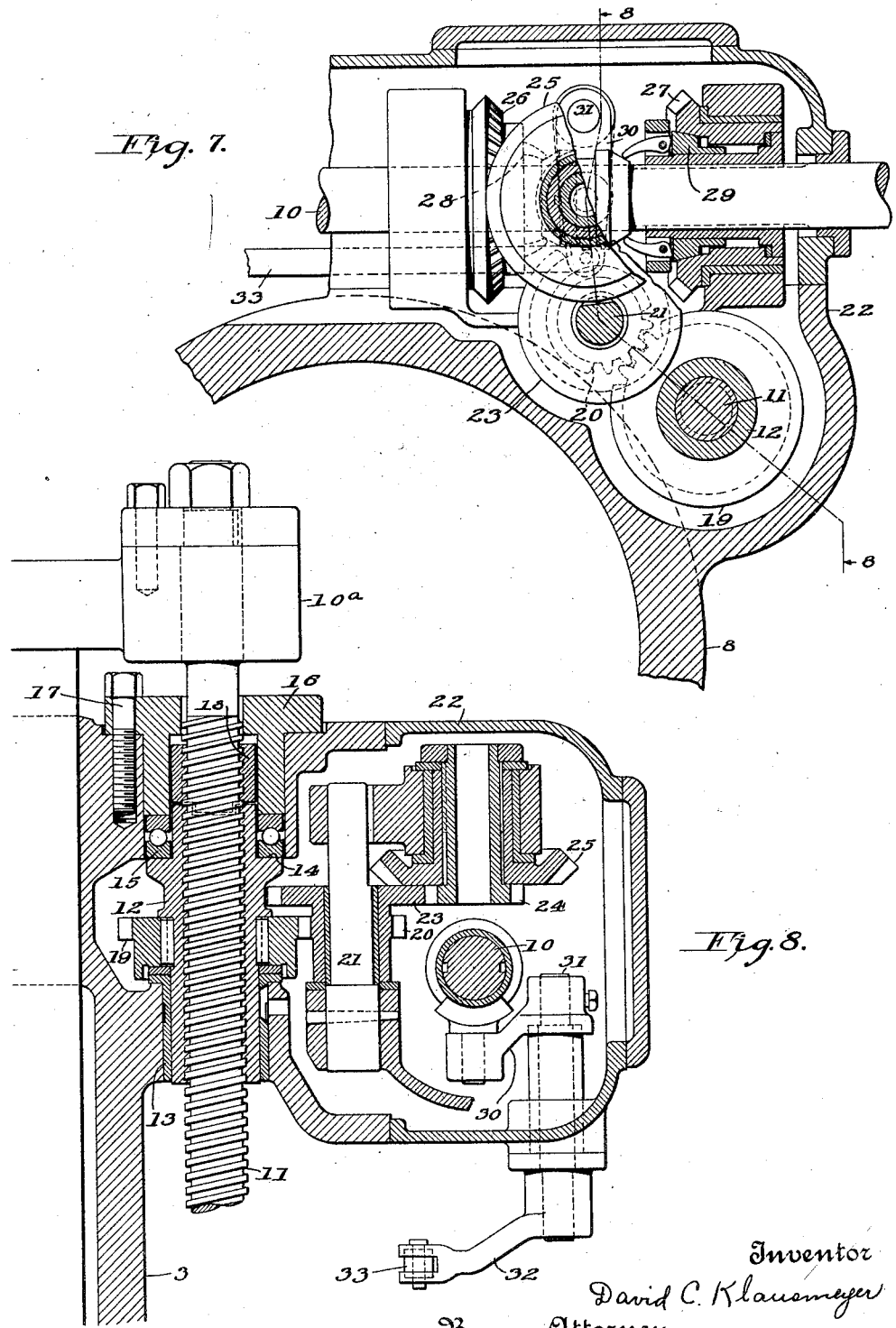

Patented Apr. 9, 1929.

1,708,420

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

MONOARM CONTROL.

Application filed November 27, 1926. Serial No. 151,062.

Various types of machine tools include a member required to be adjusted to various positions on a supporting element and securely locked thereto during a machining operation. A radial drill is a good example of a machine tool of that nature, the radial arm constituting the member required to be adjusted and locked and the usual upright sleeve or column constituting the supporting element. The adjustment of the arm lengthwise of the column is usually effected by means of a screw supported lengthwise of the column and a cooperating nut carried by the arm; one of said elements being rotated relative to the other by suitable power means.

In large size radial drills the radial arm is a ponderous element (10 feet in length) which, with the usual drill head carried thereby, weighs thousands of pounds. The contact between the elevating screw and nut prevents the arm from falling bodily when unlocked from the column but because of the fact that the arm extends almost wholly to one side of the column, the weight of the arm, and drill-head carried thereby, tends to move the outer end of the arm downwardly in an arc about a fulcrum point located at the juncture of the lower edge of the arm and the side of the column to which the arm extends. Due to the weight of the arm, and the parts carried thereby, and further due to the great leverage afforded by the length of the arm, a great lateral pressure is exerted on the column at the fulcrum point of the arm. This pressure forces the arm into contact with the column at the fulcrum point and produces slack between the arm and the column diametrically opposite the fulcrum point. Likewise the downward movement of the outer end of the arm about the fulcrum point pulls the upper portion of the arm away from the column at the side adjacent the arm and draws the diametrically opposite portion of the arm firmly into contact with the column, thus effecting substantially a two point contact between the arm and the column, which two points are at diametrically opposite sides of the column and at the upper and lower sides of the arm. This is the condition that exists when the arm is unclamped from the column to permit vertical adjustment thereof. It will readily be perceived that, with this relation between the arm and column, should a drilling operation be attempted back pressure of the work on the drill would cause the outer end of the arm to be moved upwardly about the fulcrum point and this movement would shift the drill laterally and destroy the precision of the machine. Therefore, it is essential that prior to a drilling operation all slack between the arm and column be taken up and the two become, in effect, a unitary structure. This is preferably effected by suitable clamps which serve to draw the slack sides of the arm into contact with the column and then securely to lock the two together. Inasmuch as this drawing together of the arm and column may necessitate lifting the whole arm about its fulcrum point it will be appreciated that this operation may require the application of great power.

To effect a complete and satisfactory clamping of the arm to the column it has been found desirable to utilize a plurality of spaced clamping devices. Due to the oppositely directed pressures exerted by the arm on the column it will readily be perceived that when the clamps are located at the same side of the column (for example at the side diametrically opposite that to which the arm extends) they will have substantially unequal amounts of work to perform, e. g. the upper one will be required to lift the arm and drill head until the arm and column at the side opposite the clamp are firmly in contact and then to clamp the two together, whereas the lower clamp, being located at the point where the weight of the arm produces slack between the arm and column, is merely required to clamp the two together. It is also essential that ultimately both clamps be completely set so that there can be no possibility of movement between the arm and column.

Inasmuch as the translating means for the arm is power actuated it is essential that the clamps be completely released before the translating means is rendered effective and likewise that power be disconnected from the translating means before the clamps are again closed. Otherwise one force would be acting against the other which would result in breakage of the parts.

This invention relates to clamping and translating mechanisms of the type hereinbefore described and it has for an object to provide a single control for both the translating mechanism and the clamping mechanism and so to construct the control that overlapping in the actions of the two mechanisms will be positively precluded.

Another object of the invention is to provide improved means for actuating a plurality of unequally resisted clamps whereby they may all be completely tightened by the manipulation of a single element and by substantially less power than has been required to operate prior devices.

Still another object is to overcome shocks and jars in the machine when the power is applied to translate the arm and to provide improved mechanism for this purpose which is adapted to be actuated by the single lever which also actuates the arm clamps.

These objects have been attained by the provision of a single lever adapted to actuate a plurality of clamps when the lever is given one movement and also adapted to control the action of the translating mechanism when given another movement, together with controlling means for the lever which requires that it be given an intermediate movement between successive translating and clamping movements. This intermediate movement insures that the mechanism previously connected with the lever will be disconnected therefrom before the other mechanism may be connected therewith thus precluding overlapping of action of the translating and clamping means.

To enable the lever to actuate the clamps in opposition to great resisting forces by the application of substantially low power, such as conveniently may be provided manually by the operator, power-multiplying connections are provided between the actuating lever and the clamps. The first of these multiplying connections may consist of a screw and nut gearing whereby a substantially complete rotation of the actuating lever (which may be of considerable length) under low power may be converted into a slight translating movement which transmits great power. This power delivered by the screw and nut may be received and further multiplied by suitable levers which operate individual clamps.

To transmit to the clamps power in proportion to the amount of work to be performed by the individual clamps, unequal power multiplying connections may be provided between the actuating lever and the clamps. This conveniently may be effected by the provision of clamp actuating levers of unequal lengths and actuating them all from the common actuating lever.

Equalizing means also is provided between the clamps to insure that all of the clamps ultimately will be tightened equally.

The improved means for eliminating shocks and jars when power is applied to the arm translating mechanism preferably includes friction clutches which may be engaged gradually by the manual manipulation of the single control lever.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views of which:—

Figure 1 is a front elevation of a radial drill embodying the present invention. Fig. 2 is an enlarged detail front elevation of the combined clamp-actuating and arm-translating controlling mechanism. Fig. 3 is a side elevation of the mechanism shown in Fig. 2, looking in the direction indicated by the arrows 3, the motor-supporting bracket, later to be referred to, being shown in section. Fig. 4 is a horizontal section on the line 4—4 of Fig. 3. Figs. 5 and 6 are sections on the lines 5—5 and 6—6 respectively of Fig. 4. Fig. 7 is a horizontal section showing the means for rotating the arm translating nut from the usual arm shaft, to effect vertical adjustments of the arm. Fig. 8 is a vertical section substantially on the line 8—8 of Fig. 7. Fig. 9 is a detail view showing the means for controlling the movements of the actuating lever. Fig. 10 is a detail view illustrating the action of two safety power throw-off devices adapted automatically to limit the extent of translation of the arm.

Referring more particularly to the drawings, the invention is disclosed as embodied in a radial drill comprising the usual base 1, column 2, radial arm 3, and drill head 4 adjustably mounted on the arm. In the type of radial drill illustrated the column comprises a vertically disposed post 5 secured to the base and a sleeve 6 rotatably supported upon the post, but it is to be understood that this invention is not limited to this type of radial drill. The arm 3 is rendered rotatable relative to the post by being secured to the rotatable sleeve 6, whereby the arm may be moved horizontally to position a drill point (not shown) carried by the usual spindle S relative to a work-piece supported upon the base 1. A suitable clamp is provided for locking the post and sleeve together after the desired horizontal adjustment has been effected. This clamping forms no part of the present invention and it will therefore suffice to say that it may be actuated by the lever 7 shown in Fig.

1. The arm is preferably formed with a girdle portion 8 which embraces the sleeve 6 and which is vertically movable thereon to permit vertical adjustment of the arm and drill-head as hereinbefore mentioned. Projecting from the girdle 8, at the side opposite to that to which the arm 3 extends, is a bracket 9 adapted to support a motor M from which power may be taken to rotate and translate the drill spindle and to translate the arm vertically on the column 2 as will hereinafter be more fully described. It is to be understood, however, that this invention is not limited to a radial drill in which the prime mover is carried by the arm but is likewise adaptable to radial drills in which the power enters the machine at the base of the column, flows upwardly therethrough and then to the various operative parts of the machine tool. It is also adaptable to machines other than radial drills.

As hereinbefore explained it is frequently necessary, to adjust the arm vertically on the column prior to a drilling operation. This conveniently may be effected by power from the motor M acting through the mechanism shown in Figs. 7 and 8. Extending lengthwise of the column 2 and secured in bosses 10$^a$ on the sleeve 6 (or otherwise) is a threaded shaft 11 which has a threaded connection with a nut 12 supported in a bearing 13 carried by the arm 3. The weight of the arm, and its attached parts, is supported by the nut 12 in any suitable or preferred manner. To permit the parts readily to be assembled and also to permit the nut to be freely rotatable even when it is supporting the weight of the arm, the arm may be supported upon the nut in the manner shown in Fig. 8 in which the nut is shown as provided with an upper horizontally disposed wall 14 upon which is seated an anti-friction thrust bearing 15. A bushing 16, removably secured to the arm as by means of screws 17, (only one of which is shown), rests upon the upper side of the thrust bearing and transmits to the bearing and nut the weight of the arm. A normally strain-free safety nut 18, adapted to support the arm should the threads of the nut 12 fail, may be located intermediate the nut 12 and the bushing 16.

From the foregoing it will be perceived that relative rotation between the nut 12 and screw 11 will effect vertical adjustment of the arm. This relative rotation may be effected by maintaining the screw non-rotative and rotating the nut thereon; the direction of rotation determining whether the arm will be elevated or depressed. Rotary motion is preferably (but not necessarily) transmitted to the nut from the shaft 10 extending lengthwise of the arm. To that end a gear 19 is secured to the nut and this gear is driven by a smaller gear 20 rotatably journaled on a stub-shaft 21 supported in a casing 22 formed at the rear of the arm. Rotating with the gear 20, and preferably formed integral therewith, is a gear 23 which meshes with, and is driven by, a gear 24 keyed to rotate with a bevel gear 25 also located within said casing. This bevel gear is adapted to be rotated in either of two directions by means of its engagement with similar gears 26 and 27 rotatably journaled about the arm shaft 10 and adapted selectively to be clutched thereto by means of friction clutches 28 and 29 respectively. Selective engagement of the clutches 28 and 29 may be effected by a clutch actuating member 30 secured upon a shaft 31 and adapted to be oscillated by a lever 32 which in turn is shifted by endwise movement of a link 33 later to be referred to.

It has already been explained that the arm must be unclamped from the column when the arm is given its vertical movements and that it must again be securely clamped to the column after the adjustment has been effected and before a subsequent drilling operation is begun. When the arm is unclamped from the column there exists a slight space between the two and the weight of the arm and the drill-head carried thereon tends to move the outer end of the arm downwardly and inwardly as indicated by the arrow $a$, about a fulcrum point $f$ (see Fig. 1) located at the juncture of the arm and column at the lower side of the arm. This inward pressure moves the lower portion of the girdle to the left (as viewed in Fig. 1) as indicated by the arrows $b$ thereby taking up the play between the arm and column and bringing the two forcibly in contact at the fulcrum point and producing slack between them at the diametrically opposite side of the column, as at $c$. The upper end of the girdle is moved in the opposite direction, as indicated by the arrows $d$, thereby bringing the girdle and column into contact at the point $e$, and producing slack at the opposite side, as at $g$.

In drills of the type herein described the girdle is usually split lengthwise as shown at 34 in Figs. 3 and 4 and a plurality of clamping devices serve to contract the split girdle first to take up the slack between the girdle and the column (which necessitates slightly elevating the arm and drill-head about the fulcrum $f$) and then to bind the girdle and column tightly together.

This invention provides improved means for accomplishing this result and also for selectively actuating the clutches 28 and 29 by the manipulation of a single lever 35. At opposite sides of the split 34 and at opposite ends thereof, the girdle is provided with lugs 36 and 37. Screws 38, passing freely through apertures in one end of said lugs and having their heads 39 in contact therewith, are threaded into the other of said lugs, and serve to limit the expansion of the girdle. To effect contraction of the girdle, draw-bolts 40 and 41 are passed through the lugs 36 and 37 and are provided at one end with nuts 42 and 43, respectively, bearing against one of said lugs. Lock nuts 44 and 45 are also threaded on the bolts 40 and 41 behind the nuts 42 and 43 and serve to maintain them in any position of adjustment on said bolts. The opposite end of the bolts 40 and 41 are formed as eyes through which pass pivot pins 46 and 47 for connection with clamp actuating levers 48 and 49 fulcrumed upon the rounded heads of pins 50ª and 51ª each secured in one of said lugs. The draw bolt 40, nut 42 and lever 48 form a first clamp designated generally as A and the bolt 41, nut 43 and lever 49 constitute a second clamp designated generally as B.

It will be perceived that inasmuch as the clamp A is required to take up the slack at g caused by the weight of the arm and drill head and also to contract the split girdle, whereas the clamp B is located at the slack side of the girdle and therefore is required only to contract the girdle, the work to be performed by the former is much greater than the work to be performed by the latter. This invention provides improved means whereby, upon manipulation of a single lever, power may be transmitted to the two clamps in proportion to the amount of work to be performed; or, in other words, in proportion to the resistance. This is attained by the provision of unequal power-multiplying connections between the common actuating lever and the individual clamps. This unequal distribution of power is preferably effected by having the levers 48 and 49 constructed and arranged to produce substantially unequal leverage and then applying power of substantially uniform value thereto. The free ends of the levers 48 and 49 are bifurcated and straddle a shaft 50 rotatably journaled in a housing 51 supported by the arm and preferably by the motor-supporting bracket 9. Suitable portals 48ˣ and 49ª are provided in the housing 51 to admit the free ends of the levers 48 and 49, respectively. The shaft 50 has a pivotal connection 52 with the actuating lever 35 which latter carries a ball stud 53 tracking an annular groove 54 in a head 55 secured to the housing 51. By means of this construction rotation of the lever 35 about the axis of the shaft 50 likewise rotates the shaft and movement of the lever toward and from the column shifts the shaft 50 endwise, the ball 53 in the slot 54 constituting a fulcrum for the lever. Translatably but non-rotatably mounted within the housing 51, as by means of splines 56 fitted into grooves 57 in the housing, are nuts 58 and 59 which have a threaded engagement with right and left threaded screws 60 and 61 rotatable with the shaft 50 but slidable relative thereto as by means of splines 62. Washers 63 and 64 are interposed between the nuts 58 and 59 and the free ends of the levers 48 and 49 respectively and transmit to the levers the axial movement of the nuts effected by rotation of the shaft 50. The screw and nut gearing between the shaft 50 and the clamp actuating levers 48 and 49 form a first motion reducing and force multiplying device which deliver to said levers great force from a lower force manually applied to the shaft by the lever 35. This force is further multiplied by the levers 48 and 49. The lever 35 and the parts associated therewith are so constructed and arranged that the lever may be given substantially a complete rotation whereby, due to the length and range of movement of the lever and the force multiplying devices the clamps may be actuated by the application of substantially less manual force than has heretofore been possible.

Rotary motion of the shaft 50 is also utilized to actuate the clutch shifting link 33 which causes the clutches 28 and 29 selectively to be engaged to cause the arm to be either raised or lowered. The link is connected at its rear end to an arm 65 which is attached to and projects upwardly from a collar 66 secured to one end of a bushing 67 which in turn is rotatably journaled in the rear end of the housing 51 and is held against axial movement therein by means of a dog point screw 68 fitted into an annular groove 69 in the periphery of the bushing. The bushing 67 and collar 66 are, at certain times, rotated by the shaft 50 as will later be explained. This invention further provides means for positively insuring that the arm translating means and the arm clamping means will never be effective simultaneously nor will their action overlap the slightest extent although rotary movement of the shaft 50 is utilized to actuate both mechanisms. The internal periphery of the bushing 67 is provided with a first series of grooves 69ª, adapted at certain times to receive splines 70 on a collar 71 pinned to the shaft 50, and a second series of grooves 72 permanently engaging splines 73 formed on a sleeve 74. A clearance space 72ˣ is provided between the first and second series of grooves. The sleeve 74 is loosely journaled on the shaft 50 and is restrained against axial movement thereon by being held between a shoulder 75 on the shaft and the collar 71 secured thereto. The sleeve 74 is also provided with a flange 76 formed with projections 77, in the nature of splines, which, at certain times engage the grooves 57 in the stationary housing and thereby prevent rotation of the sleeve 74 and bushing 67.

It has already been explained that both the arm translating mechanism and the arm clamps are actuated by rotary movement of the shaft 50. It is to be noted however that rotation of the shaft 50 actuates the arm translating mechanism only after the lever 35 has been moved to its innermost position as shown in full lines in Fig. 4. In this position the shaft 50 is pushed inwardly and the splines 70 on the collar 71 are moved from within the clearance space 72$^x$ into engagement with the grooves 69 in the bushing 67. With the parts in the positions shown in full lines in Figs. 2 and 4, should the lever 35 be moved upwardly to the position 35$^u$ the shaft 50, collar 71, bushing 67 and arm 65 will be moved counterclockwise thereby pulling on the link 33 and engaging the clutch 28 and causing the arm to be moved upwardly on the column. Should the lever 35 be moved downwardly from the position shown in full lines in Fig. 2 to the position 35$^d$ the above mentioned parts will be moved in the opposite direction and the clutch 29 will be engaged thereby moving the arm downwardly. As shown in Fig. 9 the lever 35 moves in a slot 78 in the head 55 when actuating the translating mechanism and this slot limits the movement of the lever to the positions 35$^u$ and 35$^d$. It is to be noted that the oscillatory movement of the shaft 50 to actuate the clutches 28 and 29 is very slight and the clamp actuating mechanisms are so designed that this slight movement does not have any appreciable effect on the clamps therefore the clamps are not actuated by the shifting of the clutches.

Intermediate its ends the slot 78 is intersected by a transverse slot 79 which, when the lever 35 is in its full line position (Fig. 2) i. e. with both of the translating clutches released, permits the lever to be moved outwardly from the column to the position shown in dotted lines, Fig. 4. This movement of the lever about its fulcrum 53—54 causes the shaft 50 to be moved axially in the direction of the arrow $t$ thereby withdrawing the splines 70 from engagement with the grooves 69 and 69$^a$ and into the clearance space 72$^x$ and disconnecting the shaft 50 from the bushing 67 so that the shaft may be rotated without actuating either of the clutches 28 and 29. This axial movement of the shaft 50 and the sleeve 74 thereon also causes the splines 77 on the flange 76 to engage the grooves 57 in the stationary housing 51 which, together with the engagement of the splines 73 with the grooves 72 in the bushing 67, serves to hold the bushing against rotation and precludes actuation of the arm translating clutches. With the arm translating means thus rendered inoperative the operator may swing the lever clockwise nearly a complete rotation to the position 35$^c$ indicated in dotted lines in Fig. 2 wherein the lever abuts against a lug 80 provided by the head 55. This rotary movement of the lever 35 acts through the screws 60 and 61, nuts 58 and 59 and levers 48 and 49 to tighten the clamps A and B as hereinbefore explained. After the clamps have been closed the translating mechanism may not again be rendered effective until the lever has been swung counter-clockwise to the position shown in full lines Fig. 2 (which movement releases the clamps) and again moved horizontally through the slot 79 into the slot 78. A collar 81 secured to the shaft 50 is adapted to engage a portion of the head 55 to limit the movement of the shaft in one direction and engagement of the collar 71 with the collar 66 limits its movement in the opposite direction.

Safety devices also are provided to limit the upward and downward movement of the arm 3. These devices preferably comprise collars 82 and 83 secured upon a rod 84 carried by the sleeve 6 and arranged in the path of a projection 85 on the lever 35 when the lever is in position to effect translation of the arm. Should the operator set the lever to elevate the arm and neglect to discontinue the upward movement of the arm the collar 82 will contact with the projection 85 and force the lever 35 downwardly into its intermediate position, which movement will disengage the clutch 28 and bring the arm to rest. The collar 83 operates in a reverse manner when the arm is moved downwardly. Due to the fact that the screws 60 and 61 and nuts 58 and 59 are free to move axially of the shaft 50 they afford an equalizing device between the clamp actuating levers 48 and 49 whereby, should one of the clamps tighten before the other, the screws and nuts will move bodily toward the lever of the looser clamp. By means of this equalizing device a complete setting of both of the clamps is ensured.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be comprehended within the meaning and range of equivalency of the following claims.

Having thus revealed this invention, I claim as new and desire to secure the following combinations and elements, or equivalents thereof, by Letters Patent of the United States:—

1. A machine tool combining a support; a member adapted to be translated relative to said support and to be clamped thereto; translating mechanism for said member; clamping mechanism for said member; a single lever pivotally secured in place and adapted selectively to be connected to both of said mechanisms, said lever being movable in one plane to control one of said mechanisms and movable in another plane to control the other of said mechanisms; and means requiring the lever to be moved in a third plane to insure total disconnection of the lever from one of said mechanisms before it is connected with the other mechanism.

2. A machine tool combining a support; a member adapted to be translated relative to said support and to be clamped thereto; translating mechanism for said member; a rotatable and translatable shaft adapted by its rotation alternately to actuate said mechanisms, said shaft being permanently connected with one of said mechanisms and adapted by its translatory movement to be connected to the other of said mechanisms; manual means to rotate and translate said shaft; means controlling the action of said manual means to limit the rotation of said shaft to a small fraction of a rotation when in one axial position and to permit a materially greater rotation when in another axial position; means actuated by the lesser rotation to control one of said mechanisms; and means actuated by the greater rotation to control the other of said mechanisms.

3. A machine tool combining a support; a member adapted to be clamped thereto; a plurality of clamps for securing said member to said support; a manually rotatable shaft; power multiplying gearing actuated by said shaft; and clamp closing levers actuated by said gearing, one of said levers being of greater length whereby a greater force is applied to its respective clamp.

4. A machine tool combining a support; a member adapted to be secured thereto; a plurality of clamps for securing said member to said support; a manually rotatable shaft; a first force-multiplying device actuated by said shaft; and unequally effective clamp actuating levers actuated by said force multiplying device to transmit to said clamps power in unequal amounts.

5. A radial drill combining a column; an arm provided with girdle surrounding said column, said girdle being split lengthwise at the side opposite to that from which the arm projects; clamping means adjacent the upper and lower ends of said girdle and positioned on opposite sides of the split opening for contracting said girdle into binding relation with said column; a single manually actuated lever rotatable in a substantial vertical plane adjacent the girdle for actuating said clamps; and unequal power transmitting means connecting said manually actuated lever with said clamps.

6. A radial drill combining a column; an arm supported by said column and projecting laterally therefrom; two vertically spaced clamps for securing the arm to the column, the upper clamp being normally forced apart by the weight of said projecting arm; a member extending transversely of said girdle; a manually operable lever movable in a substantially vertical plane and connected to said member; a connection from said member to the lower one of said clamps to transmit to said clamp power sufficient to cause it to grip said column; and power transmitting means connecting said member with the upper one of said clamps to transmit thereto substantially greater power than is transmitted to the lower clamp.

7. A radial drill combining a column; an arm translatably mounted thereon and adapted to be secured thereto; translating mechanism for said arm; clamping mechanism for said arm; a manually actuable lever adapted selectively and alternately to be connected with said mechanisms, said lever being movable a slight extent in one plane to actuate one of said mechanisms and movable in a plane parallel to the first named plane a greater extent to actuate the other of said mechanisms; and means requiring said lever to be brought to a position wherein one of said mechanisms is rendered completely ineffective before the lever may actuate the other said mechanisms.

8. A clamping mechanism comprising a plurality of clamps, one of said clamps being more resistant to actuation; a single rotary shaft providing power for actuating all of said clamps; a clamp actuating lever operatively connected with each of said clamps, said levers being of unequal length for applying unequal forces; a right and a left threaded screw rotatable with said shaft; non-rotatable nuts threaded upon said screws and adapted to be moved axially by the rotation of said shaft and means to transmit to said levers the translatory movement of said nuts to cause said levers to actuate said clamps.

9. A machine tool combining a support; a member adapted to be translated relative to said support and to be clamped thereto; translating mechanism for said member; clamps for securing said member to said support; a stationary housing a shaft rotatably and translatably journaled in said housing; a hand lever connected with said shaft for rotating and translating it; means actuated by rotation of said shaft when in one axial position to close said clamps; means actuated by said shaft when in another axial position to actuate said translating mechanism; and a locking member connected with the controlling means for the translating mechanism and adapted to be clutched to said housing to prevent actuation of the translating means when the clamps are closed.

10. A radial drill combining a column; an arm translatably mounted on said column and adapted to be clamped thereto; translating mechanism for said arm including a power shaft, a relatively rotatable complemental screw and nut, the former being supported by the column and the latter being carried by the arm and friction clutches between said power shaft and one of said relatively rotatable members for causing rotation in either direction; clamping means for said arm; a single lever adapted selectively to be connected with the arm translating and arm clamping means, said lever being adapted by one movement to release said clamps and by a subsequent movement gradually to selectively actuate either of said friction clutches to cause translation of said arm in either direction without shock.

11. A radial drill combining a column; an arm translatably mounted thereon; a shaft; a relatively rotatable screw and nut carried by said column and arm respectively and cooperating to translate the arm on the column; a reversible drive from said shaft to the rotatable one of said relatively rotatable elements including a plurality of friction clutches; means to clamp the arm to the column; a single lever for actuating said clamping means; means controlling the movement of the lever to two parallel planes and a transverse plane; means actuated by the lever when moved in one of its parallel planes to actuate said clamping means; means actuated by movement of the lever in said transverse plane operatively to connect it with said clutches; and means permitting the lever to be moved in either of two directions in a plane parallel to said first named plane selectively to engage said friction clutches to effect impositive translation of said arm.

12. In a radial drill having a supporting column and an arm translatably mounted thereon, said arm having a sleeve surrounding the column split at the rear thereof and also having a rearwardly extending bracket; a pair of clamping levers pivotally mounted on opposite sides of said bracket; and means for operating said levers comprising a shaft mounted for rotation in said bracket; a screw threaded member thereon adapted to rotate therewith; a pair of nuts engaging said screw threads, said levers being each adapted to be operated by one of said nuts, and means for rotating said shaft.

13. In a radial drill having a supporting column and an arm translatably mounted thereon said arm having a rearwardly extending bracket; means for translating said arm; means for clamping said arm to said column; and operating means for said translating means and said clamping means comprising a removable casing mounted in said bracket, mechanism therein operably connected to said translating means and said clamping means and manually operable means therefor carried by said casing.

14. A radial drill combining a column; an arm adjustably mounted thereon; a plurality of clamps for securing said arm in adjusted position on said column, one of said clamps offering greater resistance to clamping action; a rotary shaft mounted transversely of said column and arm; a manually operable lever connected to said shaft and movable in a substantially vertical plane to rotate said shaft; a pivoted actuating lever associated with each of said clamps; means for actuating said levers by rotation of said shaft, the lever extending to the clamp offering greater resistance being arranged to transmit a greater force thereto.

15. A radial drill combining a column; an arm adjustably mounted thereon; a pair of clamps for securing the arm to the column, one of said clamps offering greater resistance to operation than the other; a pivoted lever connected to each of said clamps; a rotary shaft mounted transversely of the arm; a manually operable lever connected to said shaft and movable in a substantially vertical plane for rotating said shaft; and equalizing means operated by said shaft and connected to said levers for ensuring complete actuation of both said clamps, the lever extending to said clamp having the greater resistance being proportioned to transmit a greater force thereto.

16. A radial drill combining a column; an arm mounted on said column; means for translating said arm thereon; clutch means therefor; means for clamping said arm to the column; a shaft mounted for longitudinal and rotatory movement in said arm; a manually operable lever connected thereto; means for operating said clamping means by the rotation of said shaft; and means selectively engaged by axial movement of said shaft to a predetermined axial position for actuating said clutch by rotation of said shaft.

In witness whereof, I have hereunto subscribed my name.

DAVID C. KLAUSMEYER.